United States Patent
Chen

(10) Patent No.: US 6,549,398 B2
(45) Date of Patent: Apr. 15, 2003

(54) COMPUTER ENCLOSURE INCORPORATING FASTENER

(75) Inventor: Yun Long Chen, Chung-Ho (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 161 days.

(21) Appl. No.: 09/738,085

(22) Filed: Dec. 15, 2000

(65) Prior Publication Data

US 2002/0075638 A1 Jun. 20, 2002

(51) Int. Cl.[7] .................................................. G06F 1/16
(52) U.S. Cl. ..................... 361/683; 361/684; 312/223.1; 312/223.2
(58) Field of Search .............................. 361/683, 684, 361/740, 759, 825, 801, 802; 312/223.1, 223.2; 211/41.17

(56) References Cited

U.S. PATENT DOCUMENTS

| | | | | |
|---|---|---|---|---|
| 5,673,175 A | * | 9/1997 | Carney et al. | 292/202 |
| 5,936,835 A | * | 8/1999 | Astier | 361/683 |
| 5,947,571 A | * | 9/1999 | Ho | 312/223.2 |
| 6,215,668 B1 | * | 4/2001 | Hass et al. | 24/553 |
| 6,231,139 B1 | * | 5/2001 | Chen | 312/223.2 |

* cited by examiner

*Primary Examiner*—Darren Schuberg
*Assistant Examiner*—Anthony Q. Edwards
(74) *Attorney, Agent, or Firm*—Wei Te Chung

(57) ABSTRACT

A computer enclosure includes a rear panel (42) and a fastener (10). The rear panel includes an expansion card bracket (44), a pair of pivot slots (49) and a convex portion (53). The bracket defines a plurality of expansion slots (46) adapted for providing access to expansion cards (80). The fastener includes a pair of tabs (16) inserted into the pivot slots of the rear panel, and a latch (27). The latch engages at the convex portion, thereby securing both the fastener and every expansion card to the bracket of the rear panel. A pin (70) is inserted into the fastener and the bracket, for enhancing the engagement of the fastener with the bracket of the rear panel. Every expansion card is thereby firmly secured to the enclosure.

13 Claims, 5 Drawing Sheets

COMPUTER ENCLOSURE INCORPORATING FASTENER

BACKGROUND OF THE INVENTION

1. Field of the Invention

The present invention relates to a computer enclosure, and particularly to a computer enclosure incorporating a fastener for readily securing expansion cards to the enclosure.

2. Prior Art

Almost all commercial computers provide a number of expansion slots that allow users to install optional computer cards such as network cards, sound cards, SCSI cards, and so on. Conventionally, expansion cards are secured in a computer enclosure one by one, using bolts. A tool is also required when locking the expansion cards to the enclosure. This procedure is inconvenient and time-consuming. On a computer assembly line, repeated delays caused by this procedure can disrupt manufacture.

Thus modified computer enclosures have been developed. A typical enclosure includes a rear panel and a slot cover attachable to the rear panel. In assembly, a side of each expansion card is fastened to the slot cover. The slot cover is then secured to expansion slots formed in the computer enclosure, using bolts. Even though only a small number of bolts are required, this procedure is still unduly complicated and time-consuming.

Examples of conventional computer enclosures are disclosed in U.S. Pat. Nos. 5,004,867, 4,971,563 and 4,873,395.

SUMMARY OF THE INVENTION

Accordingly, an object of the present invention is to provide a computer enclosure having a fastener which readily secures expansion cards to the enclosure.

To achieve the above object, a computer enclosure in accordance with the present invention includes a rear panel and a fastener. The rear panel includes an expansion card bracket, a pair of pivot slots and a convex portion. The bracket defines a plurality of expansion slots adapted for providing access to expansion cards. The fastener includes a pair of tabs inserted into the pivot slots of the rear panel, and a latch. The latch engages at the convex portion, thereby securing both the fastener and every expansion card to the bracket of the rear panel. A pin is inserted into the fastener and the bracket, for enhancing the engagement of the fastener with the bracket of the rear panel. Every expansion card is thereby firmly secured to the enclosure.

Other objects, advantages and novel features of the present invention will be drawn from the following detailed embodiment of the present invention with attached drawings, in which:

DETAILED DESCRIPTION OF THE PREFERRED EMBODIMENT

Figure 1A:
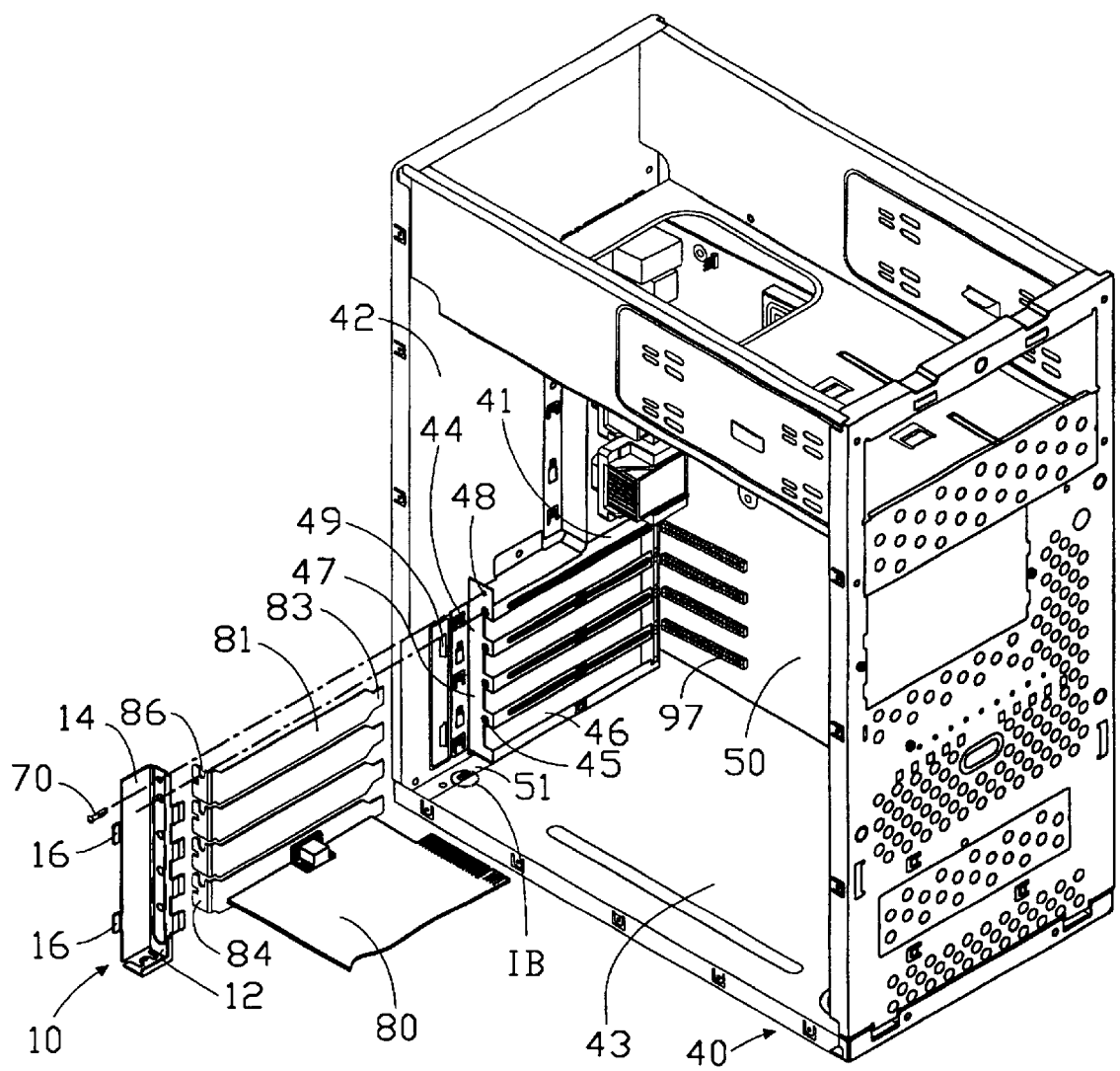
FIG. 1A is a perspective view of a computer enclosure in accordance with the present invention, together with a computer expansion card and expansion card covers.

Referring to FIG. 1A, a computer enclosure in accordance with the present invention comprises a chassis 40, a fastener 10 and a number of expansion cards 80. A pin 70 enhances the attachment of the fastener 10 to the enclosure.

Each expansion card 80 has an elongated slot cover 81, a head 84, and a tapered tail 83. The head 84 extends perpendicularly outwardly from an end of the slot cover 81. The tail 83 extends from an opposite end of the slot cover 81, coplanar with the slot cover 81. A U-shaped pit 86 is defined in an upper edge of the head 84.

The chassis 40 includes a rear panel 42, a side panel 50, and a bottom panel 43. The rear panel 42 inwardly forms an expansion card bracket 44. The bracket 44 includes an inner wall 41 and a sidewall 47. The inner wall 41 and sidewall 47 together define a plurality of horizontal parallel expansion slots 46 spaced apart at uniform intervals, for providing access to and receiving expansion cards 80. A hole 48 is defined near an upper edge of the sidewall 47 of the expansion card bracket 44. A plurality of cavities 45 is defined in the sidewall 47 below the hole 48, each cavity 45 being disposed above a respective expansion slot 46. A pair of pivot slots 49 is defined in the rear panel 42 adjacent the sidewall 47 of the expansion card bracket 44. A plurality of horizontal sockets 97 is disposed on an inner surface of the side panel 50 diagonally adjacent respective expansion slots 46 of the rear panel 42, for receiving edges of respective expansion cards 80. Receiving portions (not labeled) are formed in the expansion card bracket 44 diagonally adjacent respective sockets 97, for receiving the tails 83 of respective expansion cards 80.

Figure 1B:
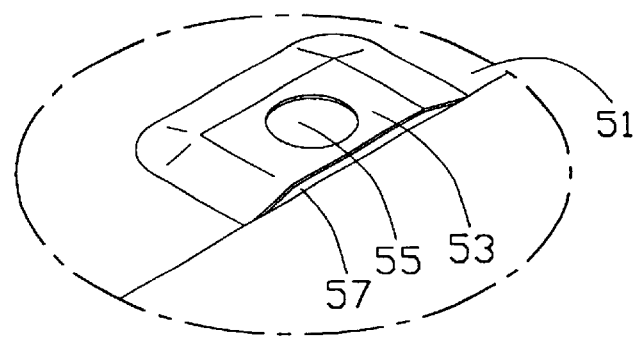
FIG. 1B is an enlarged view of a circled portion IB of FIG. 1A.

A sill 51 extends perpendicularly inwardly from a bottom edge of the rear panel 42. Referring also to FIG. 1B, a convex portion 53 is formed on the sill 51. A gap 57 is defined between the convex portion 53 and the bottom panel 43. The gap 57 is accessible at an inner edge of the convex portion 53, for receiving the fastener 10. A central aperture 55 is defined in the convex portion 53.

Figure 2:
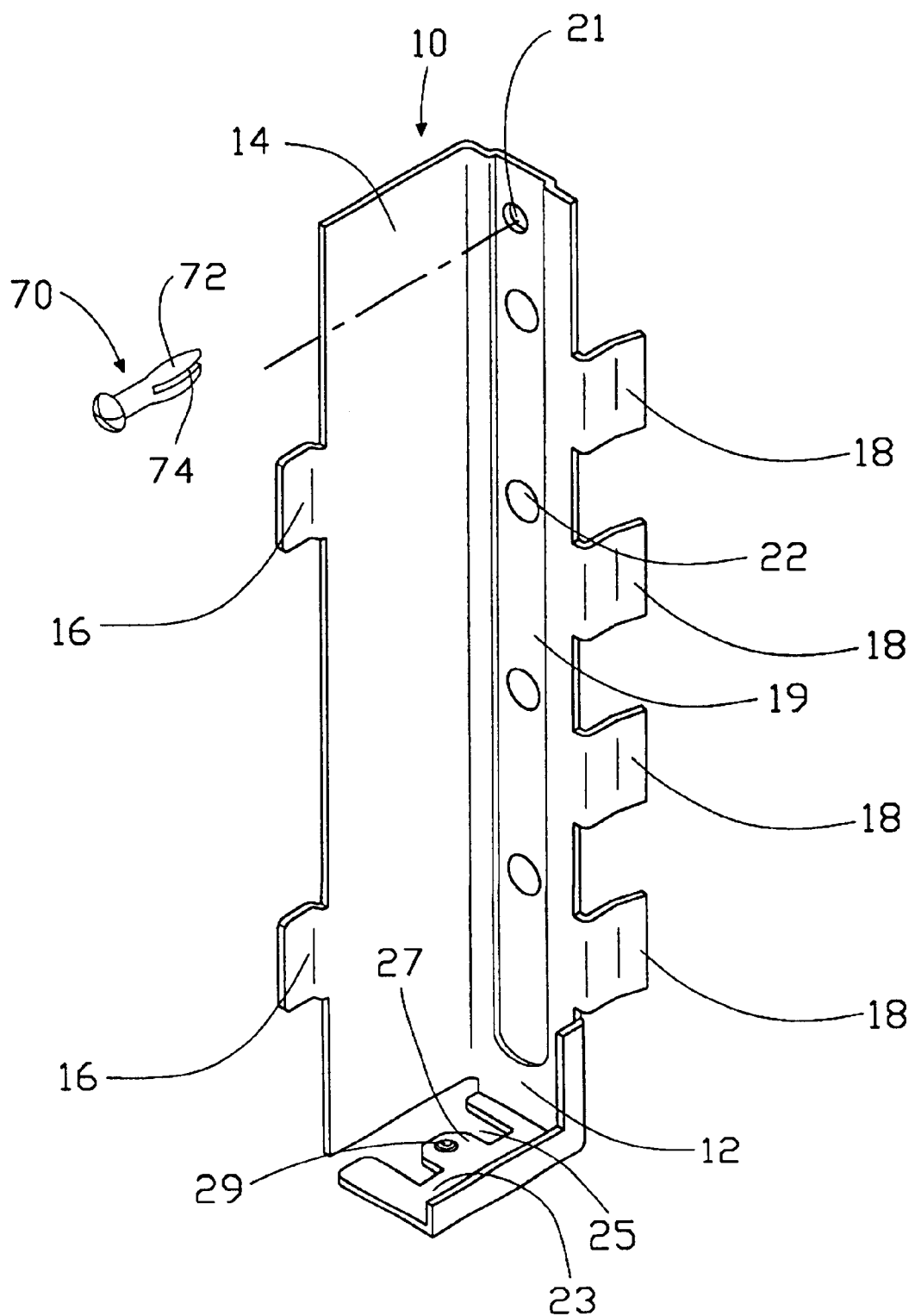
FIG. 2 is a perspective view of a fastener of FIG. 1.

Referring also to FIG. 2, the pin 70 comprises an expansion end 72. A slit 74 is defined in a central portion of the expansion end 72. This makes the expansion end 72 of the pin 70 resiliently deformable.

The fastener 10 comprises a body 12, an extending plate 14 and an engaging portion 23. The extending plate 14 extends perpendicularly from a longitudinal edge of the body 12 in a first direction. A pair of tabs 16 extends from a longitudinal free edge of the extending plate 14, corresponding to the pivot slots 49 of the rear panel 42.

The body 12 is attachable to the rear panel 42 of the enclosure, for securing the expansion cards 80 to the expansion card bracket 44. The body 12 includes an indented elongate pressing plate 19, and a plurality of elastically deformable spring fingers 18. The fingers 18 extend perpendicularly from a longitudinal edge of the body 12 opposite the extending plate 14, in a second direction which is opposite to the first direction. The pressing plate 19 defines an opening 21 near an upper edge thereof, corresponding to the hole 48 of the expansion card bracket 44. A plurality of vertically aligned nubs 22 is stamped outwardly from the pressing plate 19 in the second direction.

The engaging portion 23 extends perpendicularly from a bottom edge of the body 12 in the first direction. The engaging portion 23 is spaced from the extending plate 14. A pair of cutouts 25 is defined in the engaging portion 23 opposite the extending plate 14. A latch 27 is thus formed at the engaging portion 23 between the cutouts 25, corresponding to the gap 57 at the convex portion 53. A projection 29 is formed on a top surface of the latch 27, corresponding to the aperture 55 of the convex portion 53.

Figure 3:
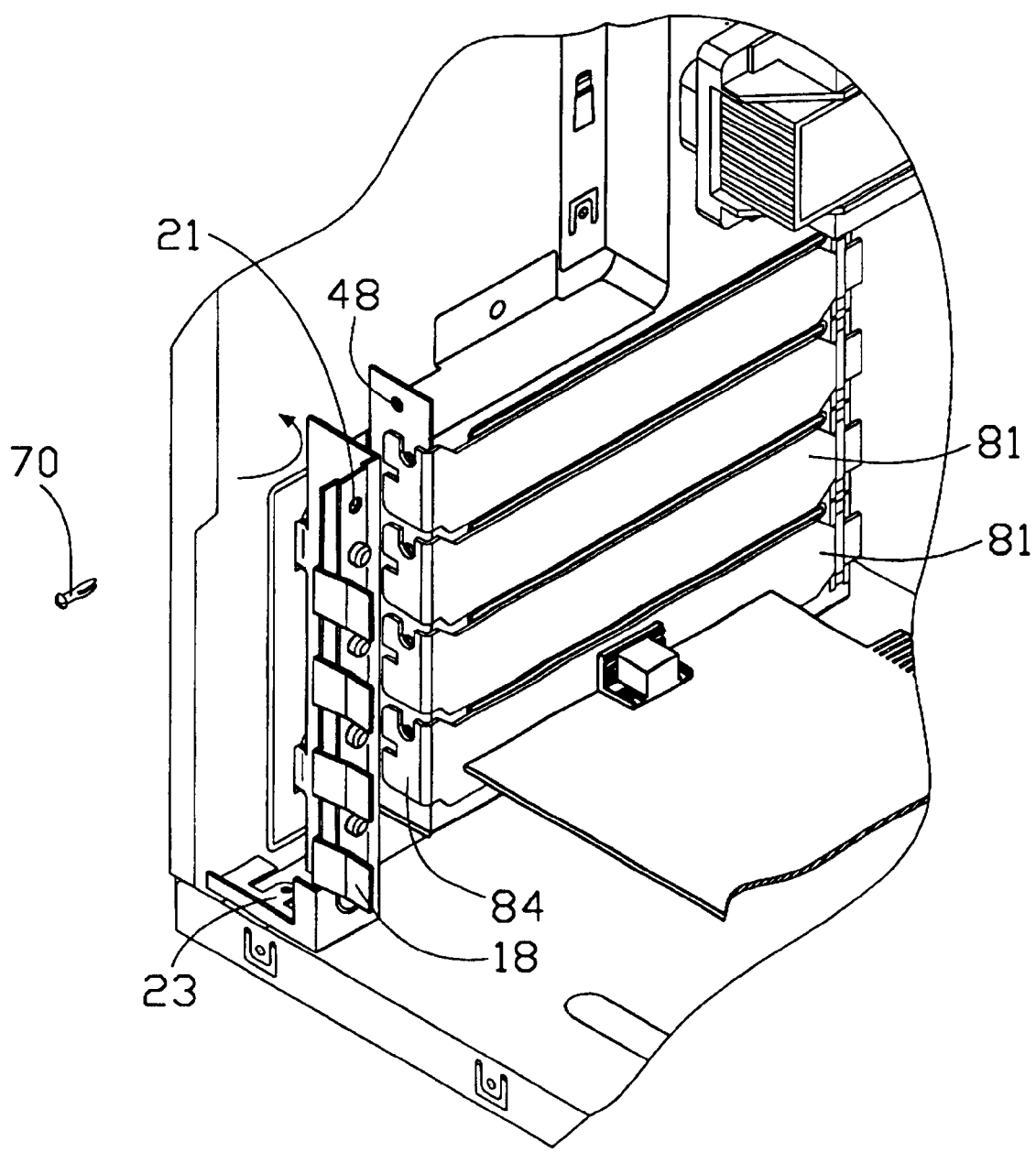
FIG. 3 is a partly assembled view of part of FIG. 1, showing the fastener at a first position.
Figure 4:
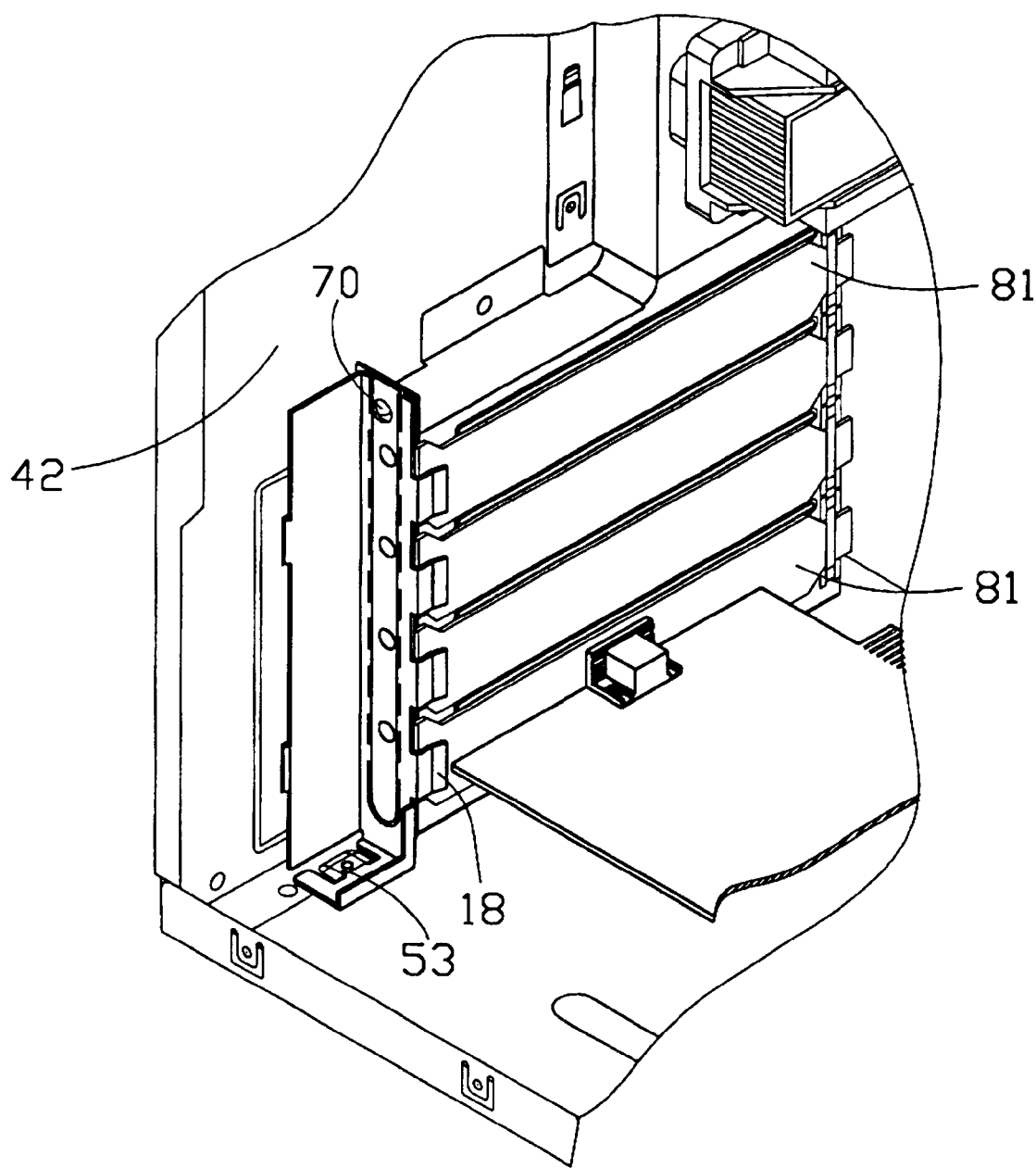
FIG. 4 is a fully assembled view of FIG. 3, showing the fastener at a second position.
Figure 5A:
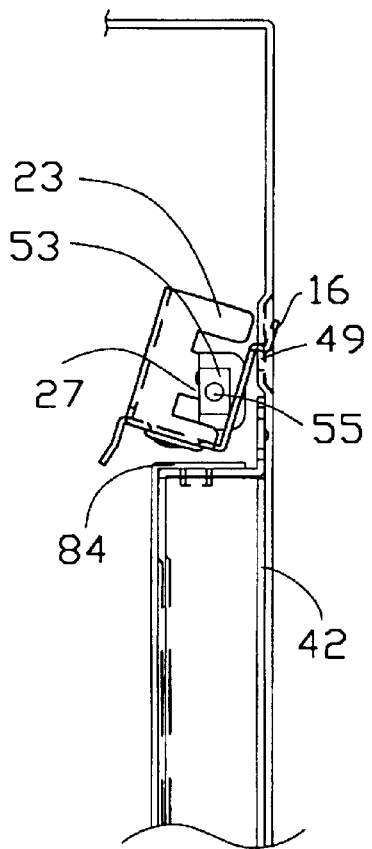
FIGS. 5A is a top plan view showing the fastener being rotated from the first position to the second position.
Figure 5B:
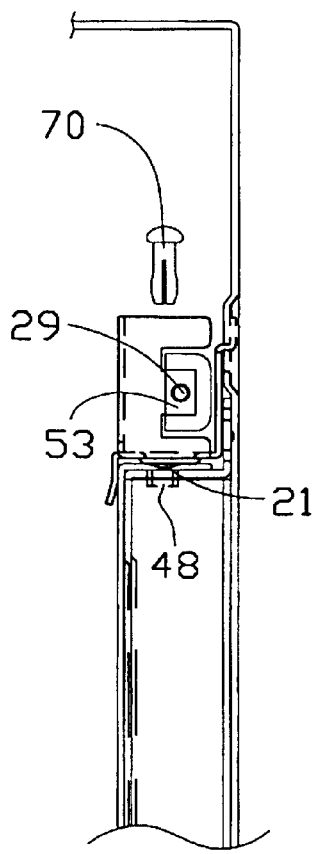
FIG. 5B is similar to FIG. 5A, but showing the fastener at the second position together with a pin of FIG. 1.
Figure 5C:
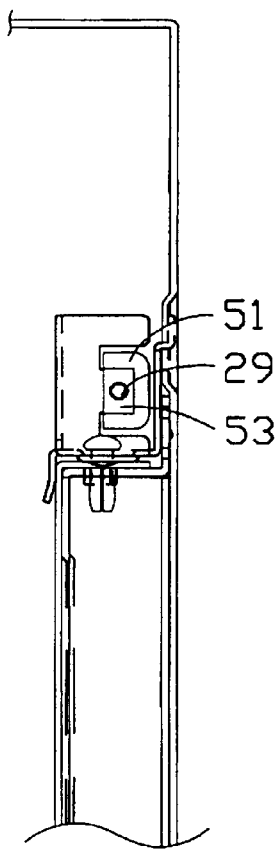
FIG. 5C is similar to FIG. 5B, but showing the pin securing the fastener to the computer enclosure.

Referring to FIG. 3, each expansion card 80 is attached to its corresponding slot cover 81 by conventional means. An edge of the expansion card 80 is inserted into the socket 97 of the enclosure. The slot cover 81 is received in the expansion slot 46. The tail 83 of the slot cover 81 is received in the receiving portion (not labeled) of the expansion card bracket 44. The tabs 16 of the fastener 10 are inserted into the pivot slots 49 of the rear panel 42. The extending plate 14 of the fastener 10 confronts the heads 84 of the slot covers 81. At this stage, the fastener 10 is defined to be in a first position, and is ready for rotation in the direction indicated by the arrow.

Referring to FIGS. 4 and 5A–5C, the fastener 10 is then rotated to a second position. The latch 27 of the engaging portion 23 is received in the gap 57 at the convex portion 53. The projection 29 of the engaging portion 23 is retained in the aperture 55 of the convex portion 53. The nubs 22 of the fastener 10 are engagingly received in the pits 86 of the slot covers 81 and the cavities 45 of the sidewall 47. The fingers 18 of the fastener 10 press the slot covers 81 of the expansion cards 80. At this stage, the fastener 10 is defined to be in a second position. The pin 70 is then inserted through the opening 21 of the fastener 10 and the hole 48 of the chassis 40. The expansion end 72 of the pin 70 elastically deforms until the pin 70 is resiliently retained in the sidewall 47 of the bracket 44. Every expansion card 80 is thereby firmly secured to the chassis 40 of the computer enclosure.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:
   a chassis comprising a rear panel and a bottom panel connected to the rear panel, the rear panel comprising an expansion card bracket, at least one pivot slot adjacent to the expansion card bracket, and a sill, the expansion card bracket defining a plurality of expansion slots, the sill forming a convex portion to define a gap between the sill and the bottom panel;
   a plurality of slot covers attached to the expansion card bracket and covering the corresponding expansion slots; and
   a fastener comprising a body for securing the slot covers to the rear panel, at least one tab extending into the at least one pivot slot of the rear panel, and a latch engagingly received in the gap of the chassis thereby securing the fastener to the rear panel.

2. The computer enclosure as recited in claim 1, wherein at least one projection is formed on the latch of the fastener, and wherein at least one aperture is defined in the convex portion for engaging with the at least one projection.

3. The computer enclosure as recited in claim 1, wherein the fastener defines an opening, and the expansion card bracket defines a hole, and wherein a pin is engagingly received in the hole and the opening, thereby enhancing attachment of the fastener to the rear panel.

4. The computer enclosure as recited in claim 1, wherein the body of the fastener forms a plurality of nubs, and wherein each slot cover defines a pit therein for engagingly receiving the corresponding nub.

5. The computer enclosure as recited in claim 1, wherein a plurality of resilient fingers extends from the body of the fastener, for pressing the slot covers against the expansion card bracket.

6. The computer enclosure as recited in claim 1, wherein an engaging portion extends from the body of the fastener, the engaging portion defining two cutouts therein to form the latch.

7. A computer enclosure comprising:
   a rear panel comprising an expansion card bracket, and at least one pivot slot adjacent the expansion card bracket, the expansion card bracket defining a plurality of expansion slots and at least one hole therein;
   a plurality of slot covers attached to the expansion card bracket and covering the corresponding expansion slots; and
   a fastener comprising a body for securing the slot covers to the rear panel, at least one tab extending into the at least one pivot slot of the rear panel, at least one opening corresponding to the at least one hole of the rear panel, and at least one pin engagingly received in the at least one opening and the at least one hole of the rear panel for attaching the fastener to the rear panel;
   wherein the body of the fastener forms a plurality of nubs, and wherein each slot cover defines a pit therein for engagingly receiving the corresponding nub.

8. The computer enclosure as recited in claim 7, wherein the computer enclosure further comprises a bottom panel, and a sill extends from the rear panel and forms a convex portion to thereby define a gap between the sill and the bottom panel, and a latch is formed at the fastener for being engagingly received in the gap and thereby enhancing attachment of the fastener to the rear panel.

9. The computer enclosure as recited in claim 7, wherein a plurality of resilient fingers extends from the body of the fastener, for pressing the slot covers against the expansion card bracket.

10. A computer enclosure comprising:
    a panel defining at least one elongated slot extending along an elongated direction thereof for an expansion card;
    at least one slot cover attached to the panel and covering the slot;
    a fastener comprising a body securing the slot cover to the panel;
    said fastener being pivotally assembled to the panel about an axis perpendicular to said elongated direction;
    a securing device securing the fastener to the panel after the fastener has been rotated to a final position where a spring finger of the fastener abuts against the slot cover; and
    means for aligning the fastener, the slot cover and the panel together along said elongated direction when said fastener is in the final position;
    wherein said means includes a nub on the fastener, a pit of the slot cover and a cavity of the panel.

11. The enclosure as recited in claim 10, wherein said fastener includes at least one tab engaged with the panel to define said axis.

12. The enclosure as recited in claim 10, wherein said fastener includes an engaging portion for preventing movement of the fasteners relative to the panel along a direction of said axis.

13. A computer enclosure comprising:
- a panel defining at least one elongated slot extending along an elongated direction thereof for an expansion card;
- at least one slot cover attached to the panel and covering the slot;
- a fastener comprising a body securing the slot cover to the panel;
- said fastener being pivotally assembled to the panel about an axis perpendicular to said elongated direction;
- a securing device securing the fastener to the panel after the fastener has been rotated to a final position where a spring finger of the fastener abuts against the slot cover; and
- means for aligning the fastener, the slot cover and the panel together along said elongated direction when said fastener is in the final position;
- wherein said fastener includes at least one tab engaged with the panel to define the axis.

\* \* \* \* \*